US009803156B2

(12) United States Patent
Zhu et al.

(10) Patent No.: US 9,803,156 B2
(45) Date of Patent: Oct. 31, 2017

(54) AQUEOUS CUTTING FLUID COMPOSITION

(71) Applicant: Dow Global Technologies LLC, Midland, MI (US)

(72) Inventors: Yi Ping Zhu, Shanghai (CN); Bing Liang, Shanghai (CN); Andong Liu, Shanghai (CN); Wanglin Yu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 61 days.

(21) Appl. No.: 14/647,278

(22) PCT Filed: Dec. 6, 2012

(86) PCT No.: PCT/CN2012/086049
§ 371 (c)(1),
(2) Date: May 26, 2015

(87) PCT Pub. No.: WO2014/086024
PCT Pub. Date: Jun. 12, 2014

(65) Prior Publication Data

US 2015/0315513 A1 Nov. 5, 2015

(51) Int. Cl.

| | |
|---|---|
| ***C09K 3/14*** | (2006.01) |
| ***C10M 165/00*** | (2006.01) |
| ***B28D 5/00*** | (2006.01) |
| ***C10M 173/02*** | (2006.01) |

(52) U.S. Cl.
CPC ......... *C10M 165/00* (2013.01); *B28D 5/0076* (2013.01); *C10M 173/02* (2013.01); *C10M 2207/127* (2013.01); *C10M 2209/103* (2013.01); *C10M 2209/104* (2013.01); *C10N 2220/14* (2013.01); *C10N 2230/04* (2013.01); *C10N 2240/401* (2013.01)

(58) Field of Classification Search
CPC ................ C09C 1/00; C09C 1/04; C09K 3/14
See application file for complete search history.

(56) References Cited

U.S. PATENT DOCUMENTS

| | | | |
|---|---|---|---|
| 3,478,732 A | 11/1969 | Clark et al. | |
| 3,525,324 A | 8/1970 | Bonnefoy et al. | |
| 4,024,072 A | 5/1977 | Shane et al. | |
| 4,874,540 A * | 10/1989 | Greenwald | C02F 1/683 510/476 |
| 5,270,271 A | 12/1993 | Lundin et al. | |
| 6,383,991 B1 | 5/2002 | Hashimoto et al. | |
| 6,572,789 B1 | 6/2003 | Yang et al. | |
| 7,612,024 B2 | 11/2009 | Li et al. | |
| 2007/0010406 A1 | 1/2007 | Okamoto et al. | |
| 2007/0167335 A1 | 7/2007 | Combs et al. | |

FOREIGN PATENT DOCUMENTS

| | | |
|---|---|---|
| CN | 102352278 A | 2/2012 |
| CN | 102363738 A | 2/2012 |
| CN | 102382712 A | 3/2012 |
| CN | 102433190 A | 5/2012 |
| CN | 102686713 | 9/2012 |
| EP | 1808475 | 7/2007 |
| EP | 2415853 | 2/2012 |
| EP | 2679661 | 1/2014 |
| JP | 2011079956 | 4/2011 |
| JP | 2011201959 | 10/2011 |
| JP | 2011230275 A | 11/2011 |
| JP | 2011246557 A | 12/2011 |
| JP | 2012087297 A | 5/2012 |
| JP | 2012092256 A | 5/2012 |
| JP | 2012116922 A | 6/2012 |
| JP | 2011148974 A | 8/2012 |
| WO | 2011/024486 A1 | 3/2011 |
| WO | 2011/044716 A1 | 4/2011 |
| WO | 2011/044717 A1 | 4/2011 |
| WO | 2011/044718 A1 | 4/2011 |

OTHER PUBLICATIONS

Pan et al., Lubrication Engineering, vol. 35, No. 8, Aug. 2010, pp. 104-110.
Liu, et al., "Cutting Fluid Technology"; China Machine Press (Sep. 30, 2008) (3 pgs) (Translation and Original Document Attached).
Pan, et al., "Lubrication Engineering", vol. 35, No. 8, Aug. 2010 (13 pgs) (Complete Translation).

* cited by examiner

*Primary Examiner* — Pegah Parvini
(74) *Attorney, Agent, or Firm* — Brooks, Cameron & Huebsch, PLLC

(57) ABSTRACT

A water-based cutting fluid that comprises water and a water-soluble polyalkylene glycol (PAG) having cloud point from 30° C. to 80° C. The cutting fluid is water-based, i.e., it comprises at least 50 percent by weight (wt %) water. The cutting fluids are well suited for use with diamond wiresaws for the cutting of silicon ingots. The fluids exhibit one or more of low hydrogen generation, no wafer cleaning issues, good lubricity, good cooling efficiency, good swarf suspension and dispersion, low foaming, are generally non-sensitive to metal ions, and are nonflammable.

15 Claims, 1 Drawing Sheet

AQUEOUS CUTTING FLUID COMPOSITION

FIELD OF THE INVENTION

This invention relates to cutting fluids. In one aspect the invention relates to aqueous cutting fluids while in another aspect, the invention relates to aqueous cutting fluids for use with diamond wire saws.

BACKGROUND OF THE INVENTION

Diamond wire slicing is a technology that is being adopted for photovoltaic (PV) silicon wafer manufacturing. Different from loosen abrasive wire saw technology, diamond wire fixes abrasive grains on a core wire with a resin layer or by electroplating and performs cutting action through the fixed abrasive grains. The slicing process includes moving the diamond wire saw against the work piece, e.g., a silicon ingot, while a cutting fluid or coolant is sprayed onto the wire web from a storage tank. The liquid film formed on the wire web or wires travel with the moving wires to the contact front of the work piece to provide cooling and lubrication. The cutting fluid then falls back to the storage tank together with work piece powders or particles generated from the slicing process. The cutting fluid mixture is cooled and circulated back for continuous use until the cutting fluid becomes exhausted or the content of powders reaches a certain level. The temperature of the cutting fluid or the mixture of cutting fluid and powders is maintained at or slightly below room temperature, e.g., 25° C. At the contact surface of wire with a silicon ingot, the temperature typically ranges from 50° to 80° C. due to the friction between ingot and wire. In addition to the primary functions of cooling and lubrication, the cutting fluid should also provide suspension and carrying (i.e., dispersion) capability of the work piece powders (swarf), and it should generate little, if any, foam.

Water-based cutting fluids are desired for diamond wire wafer slicing because they provide good cooling efficiency and less environmental impact, and they offer the potential for lower cost. However, technical challenges exist that prevent water-based cutting fluids from being practically acceptable. The major challenges include wafer surface cleaning difficulties and hydrogen generation, which are typically associated with the reaction of a freshly generated silicon surface with water. In addition, the lubricity of water-based cutting fluids is inferior to polyalkylene glycol (PAG) based cutting fluids.

Of interest to practitioners of diamond wire cutting technology, particularly to those who use this art to cut silicon ingots, is a water-based cutting fluid that exhibits good lubricity and dispersion capacity yet minimizes hydrogen production and wafer cleaning issues.

SUMMARY OF THE INVENTION

In one embodiment the invention is a water-based cutting fluid that comprises water and a water-soluble polyalkylene glycol (PAG) having cloud point from 30° C. to 80° C., more typically a cloud point from 40° C. to 70° C. and even more typically cloud point from 40° C. to 60° C.

In one embodiment the invention is a cutting fluid comprising:

(A) Water-soluble PAG with a cloud point from 30° C. to 80° C., (B) Water, and at least one of:

(C) A wetting agent;

(D) A dispersing agent;

(E) A defoamer;

(F) A corrosion inhibitor;

(G) A chelant; and (H) A biocide.

In certain embodiments of the invention, the cutting fluid comprises two, three, four, five or all six of the optional components. The cutting fluid is water-based, i.e., it comprises at least 50, typically at least 60, more typically at least 80 and even more typically at least 90, percent by weight (wt %) water. Typically, the cutting fluid comprises less than 98, more typically less than 97, wt % water. The water source can vary widely, and typically the water is free of particulates or other contaminants. Typically the water is demineralized and/or de-ionized.

The cutting fluids of this invention exhibit low viscosity, good cooling efficiency, good swarf suspension and dispersion, good wetting of swarf particles (particularly silicon particles), good cleaning of the diamond wiresaw, good wafer surface cleaning, low foaming, are generally nonsensitive to metal ions, and are nonflammable. The cutting fluids of this invention are also very stable at high temperatures and have a relatively long life, e.g., typically a fluid can be used for the cutting of multiple workpieces before it needs to be replaced. Still further, any residual cutting fluids on silicon swarf can be easily removed making for a facile recycle of the swarf.

In one embodiment the invention is a process of cutting a hard, brittle material with a wiresaw used in conjunction with a water-based cutting fluid, the process comprising the step of contacting the material with the wiresaw and cutting fluid under cutting conditions, the cutting fluid comprising:

(A) Water-soluble PAG with a cloud point from 30° C. to 80° C., (B) Water, and at least one of:

(C) A wetting agent;

(D) A dispersing agent;

(E) A defoamer;

(F) A corrosion inhibitor;

(G) A chelant; and (H) A biocide.

The cutting fluid is applied to the wiresaw, typically a diamond wiresaw, and typically at or just before the contact point, i.e., the interface, of the workpiece and the wiresaw, In one embodiment the invention is a cutting fluid pre-mix comprising:

(A) Water-soluble PAG with a cloud point from 30° C. to 80° C., (B) Water, and at least one of:

(C) A wetting agent;

(D) A dispersing agent;

(E) A defoamer;

(F) A corrosion inhibitor;

(G) A chelant; and (H) A biocide.

In this embodiment the pre-mix is converted to a cutting fluid by the addition of water.

DETAILED DESCRIPTION OF THE PREFERRED EMBODIMENT

Definitions

Figure 1:
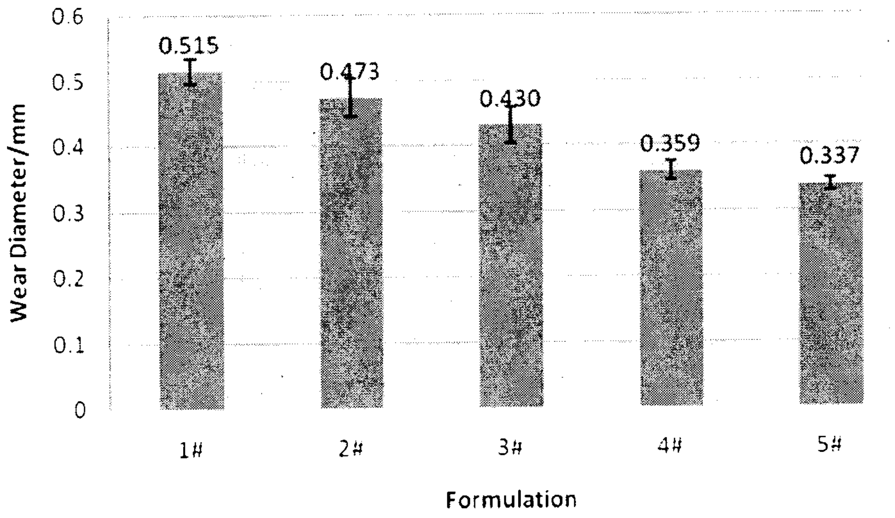
FIG. 1 is a bar graph reporting the results of a four-ball wear test.

Unless stated to the contrary, implicit from the context, or customary in the art, all parts and percents are based on weight. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of polyglycol in a coolant.

"Compatible with the other components of the cutting fluid" and like terms mean that a particular component of the cutting fluid, e.g., wetting agent, dispersing agent, defoamer, corrosion inhibitor, etc., will not block or significantly impede the performance of the other components of the cutting fluid.

PAG cloud point is the temperature at which a previously clear, single-phased solution of the PAG becomes cloudy due to separation of a second phase. The measurement of the cloud point is performed according to ASTM D 2024. This cloudiness lowers the transmittance of light passing through the sample to a detector. Transmittance is measured using a Mettler FP90 Cloud Point System, calibrated with benzophenone and/or benzoic acid. Samples are prepared as 1 wt % surfactant in de-ionized water. The Cloud Point System gradually increased temperature (typically 3° C./min) from approximately 15° C. below the expected cloud point to 10° C. above the expected cloud point. The F factor (light transmittance reduction criterion) is set at 4% to 28%.

Overview

During the slicing of an ingot into silicon wafers, if the local temperature, i.e., the temperature in the wire/ingot contact zone or in other words, the surface temperature of the ingot at the point at which the wire contacts the ingot, becomes higher than the cloud point of the polyglycol in the coolant, then the polyglycol will "phase-out" from the coolant as oil. The phased-out polyglycol will form an oil layer on both the diamond wire and the ingot surfaces to provide effective lubrication. At the same time and particularly with respect to silicon ingots, the oil film on the ingot surface can provide a protective layer to suppress the formation of hydrogen from the reaction of water with the freshly generated ingot, wafer or swarf surfaces. When the wire moves forward, the oil layer on the silicon surfaces (including the powder surfaces) will return to the bulk of the coolant when the temperature of the coolant drops back to below the cloud point of the polyglycol. This allows the coolant to be continuously circulated and used.

Polyalkylene Glycol (PAG)

The polyalkylene glycols used in the practice of this invention are known compounds, and they are made by the polymerization of an alkylene oxide monomer or a mixture of alkylene oxide monomers initiated by one or more of water and a mono-, di- or polyhydric compound, and promoted by a catalyst under reactive conditions known in the art (see, for example, "Alkylene Oxides and Their Polymers", Surfactant Science Series, Vol 35).

In one embodiment the initiator is ethylene or propylene glycol or an oligomer of one of them. In one embodiment, the initiator is a compound of the formula $$R^1O—(CHR^2CH_2O)_m—R^3$$

in which $R^1$ and $R^3$ are independently a $C_1$ to $C_{20}$ aliphatic or aromatic group with linear or branched structure and which may contain one or more unsaturated bonds, or hydrogen, with the proviso that at least one of $R^1$ and $R^3$ is hydrogen; each $R^2$ is independently hydrogen, methyl, or ethyl; and m is an integer of 0 to 20. In one embodiment the starter compound is a hydrocarbon compound containing 3 or more hydroxyl groups, such as glycerol or sorbitol.

In one embodiment, the catalyst is a base, typically at least one of an alkali or alkaline earth metal hydroxide or carbonate, aliphatic amine, aromatic amine, or a heterocyclic amine. In one embodiment, sodium or potassium hydroxide is the base catalyst.

The alkylene oxide used as the monomer in the polymerization is a $C_2$ to $C_8$ oxide, such as ethylene oxide, propylene oxide, butylene oxide, hexene oxide, or octene oxide. In one embodiment, the alkylene oxide is ethylene or propylene oxide. Upon completion of the polymerization, the reaction mixture is vented and then neutralized by the addition of one or more acids. The neutralized polyalkylene glycol product has a pH value of 4.0 to 8.5.

In one embodiment of this invention the polyalkylene oxide is polyethylene oxide, or a water soluble or dispersible copolymer of ethylene oxide (EO) and propylene oxide (PO), or a mono methyl, ethyl, propyl, or butyl ether of one of them, or a polyethylene oxide or a copolymer of EO and PO initiated by glycerol. In one embodiment, the polyalkylene glycol has a molecular weight of 100-1,000, more typically of 200-600.

The amount of PAG in the cutting fluid, based on the total weight of the fluid, is typically at least 0.01 weight percent (wt %), more typically at least 0.05 wt % and even more typically at least 0.1 wt %. The maximum amount of PAG in the cutting fluid is mostly a matter of economics and convenience, but typically it is not in excess of 20, more typically not in excess of 10 wt % and even more typically not in excess of 5 wt %. The PAG used in the practice of this invention may also act, in part, as a wetting agent and/or as a dispersing agent. Although typically used alone or as a combination of two or more PAG, the PAG can be used in combination with one or more other optional ingredients.

Wetting Agent

Any compound that is compatible with the other components of the cutting fluid and can effectively reduce the surface tension of an aqueous formulation, e.g., the cutting fluid, and thus effectively wet the surfaces of the workpiece and wiresaw can be used in the practice of this invention. The wetting agent is a surfactant or a surfactant mixture that is soluble or dispersible in water, and is typically anionic, nonionic or zwitterionic in charge.

Examples of anionic wetting agents include carboxylic acid salt based surfactants, such as sodium, potassium, or amine salts of fatty acids, acrylatedaminoacids, acrylated polypeptides, and polyoxyalkylenated fatty alcohol carboxylates; sulfonic acid salt based surfactants, such as alkylbenzenesulfonates, petroleum sulfonates, α-olefin sulfonates, paraffin sulfonates, secondary n-alkanesulfonates, N-acyl-n-alkyltaurates, arylalkanesulfonates, alkyldiphenylether(di)sulfonates, sulfosuccinate esters, alkylnaphthalenesulfonates, and isethionates; sulfuric acid ester salt based surfactants, such as sulfated alcohols, sulfated polyoxyalkylenated alcohols, sulfated triglyceride oils, fatty acid monoethanolamide sulfates, silicon-based surfactants, polyoxyalkylenated fatty acid monoethanolamide sulfates; and phosphoric or polyphosphoric acid esters. In the anionic surfactants, the hydrophobes can be linear or branched hydrocarbon chains, linear or branched alkyl aryl, linear or branched alkyl phenol, and the hydrocarbon chain may contain unsaturated carbon-carbon bonds and can be partially or fully fluorinated.

Examples of nonionic surfactants that are suitable for use as the wetting agent include linear or branched primary or secondary alcohol ethoxylates or alkoxylates in which propylene oxide (PO), butylene oxide (BO), or higher alkylene oxide units may be included in different fashions, such as by block copolymerization, random copolymerization or end capping and in which the hydrocarbon chain may contain unsaturated carbon-carbon bonds and can be partially or fully fluorinated; amine alkoxylates; alkylphenolethoxylates; block copolymer of ethylene and propylene oxide or butylenes oxide; long chain carboxylic acid esters, such like glyceryl and polyglyceryl esters of fatty acids, sorbitol or polyoxyethylene sorbitol esters; alkylpolyglycosides; ethoxylatedacetylenicdiols; and siloxane surfactants. In the nonionic surfactants, the terminal hydroxyl groups may be replaced by chlorine, alkylether, allylether, benzylether, acetate, or acetal as partially or fully "capped" surfactants.

Examples of zwitterionic surfactants that are suitable for use as the wetting agent include alkyl betaine, cocamidopropylbetaine, hydroxysultaiane, lecithin and sodium lauroamphoacetate. Additional zwitterionic surfactants are described in U.S. Pat. No. 4,301,044 and the references cited within it.

Preferred surfactants or surfactant combinations provide impart a surface tension to the cutting fluid of less than 45 mN/m. Typically the selection of the surfactant or surfactant combination results in no foaming, low foaming, or unstable foaming of the formulation. Preferably the surfactant is readily biodegradable as determined by an OECD 301 method. Surfactants with low surface tension based on secondary alcohol or high branched second alcohol ethoxylate (SAE) are preferred.

The amount of wetting agent in the cutting fluid, based on the total weight of the fluid, is typically at least 0.01, more typically 0.1, wt %. The maximum amount of wetting agent in the cutting fluid is mostly a matter of economics and convenience, but typically it is not in excess of 5, more typically not in excess of 3 and even more typically not in excess of 2, wt %.

Dispersing Agent

The dispersing agents, or simply "dispersants", used in the practice of this invention are water soluble polymers that contain one or more negatively charged groups after dissociation in water. Examples of negatively charged groups include carboxylic, sulfonic, sulfinic and phosphoric. Examples of the polymers include the homopolymers and copolymers of acrylic acid, methacrylic acid, alkenyl sulfonic acid, aromatic alkenyl sulfonic acid, acrylamidosulfonic acid and maleic acid, known collectively as polycarboxylates. The polymers may include the units from water-insoluble co-monomers such as styrene, alkylstyrene, alkyl acrylate and alkyl methacrylate in which the hydrogen on the alkyl group may be replaced by fluorine, chlorine, hydroxyl or other atoms or groups, and the alkyl may contain one or more oxygen, sulfur, or silicon atoms, and aryl acrylate or aryl methacrylate, in an amount that can maintain sufficient water solubility of the polymers. Among the polycarboxylic acid-based polymer compounds identified above, particularly suitably used compounds include the alkaline metal salts and/or onium salts of the homopolymer of acrylic acid and/or the copolymer of acrylic acid and maleic acid. The weight-average molecular weight (Mw) of the polycarboxylic acid-based polymer compound and/or a salt is typically 1,000-1,000,000, more typically 1,000-100,000 and even more typically 1,000-30,000. These polymers, or the negatively charged repeat units in these polymers, may be and are sometimes preferably grafted with one or more water soluble polymers, such as a polyalkylene glycol (PAG), particularly a polyethylene glycol (PEG), through different grafting linkages, such as ester, ether or a carbon-carbon bond.

The amount of dispersing agent in the cutting fluid, based on the total weight of the fluid, is typically at least 0.01, more typically 0.1, wt %. The maximum amount of dispersing agent in the cutting fluid is mostly a matter of economics and convenience, but typically it is not in excess of 20, more typically not in excess of 15 and even more typically not in excess of 10, wt %.

Defoamer

Any compound that is compatible with the other components of the cutting fluid and will minimize or eliminate foaming of the cutting fluid while the fluid is stored, e.g., held in a reservoir tank of a diamond wiresaw apparatus, and is in use, e.g., pumped from the tank and applied to the wiresaw and workpiece surfaces, can be used in the practice of this invention. Exemplary defoamers include organo-modified polysiloxanes and polyethers. Exemplary defoamers include alkyl polysiloxane such as dimethyl polysiloxane, diethyl polysiloxane, dipropyl polysiloxane, methyl ethyl polysiloxane, dioctyl polysiloxane, diethyl polysiloxane, methyl propyl polysiloxane, dibutyl polysiloxane and didodecyl polysiloxane; organo-phosphorus compound such as n-tri-butyl phosphate, n-tributoxyethyl phosphate or triphenylphosphite, or a mixture therefore; and copolymer of poly alkylene oxide (ethylene oxide, propylene oxide and butylene oxide). Preferably are those water dispersible or soluble defoamer as described in U.S. Pat. No. 4,024,072 and the references cited within it.

Typically the cutting fluids of this invention comprise a defoamer. The amount of defoamer in the cutting fluid, based on the total weight of the fluid, is typically greater than zero, more typically at least 0.01 and even more typically 0.1, wt %. The maximum amount of defoamer in the cutting fluid is mostly a matter of economics and convenience, but typically it is not in excess of 5, more typically not in excess of 3, wt %.

Corrosion Inhibitor

Any compound that is compatible with the other components of the cutting fluid and will inhibit or eliminate corrosion of the surfaces of a diamond wiresaw apparatus with which the cutting fluid comes in contact in its usual storage and use can be used in the practice of this invention. Exemplary corrosion inhibitors include alkanolamines, borate esters, amine dicarboxylates and triazoles. Exemplary corrosion inhibitors include phosphorus containing chemicals such as orthophosphates, pyrophosphates, polyphosphates; hydroxycarboxylic acids and their salts, such as gluconic acids; glucaric acid; alkanolamines; nitrites; carboxylates; silicates; phosphonates and azole compounds such as benzotriazole, tolyltriazole, mercaptobenzothiazole, and halogenated azoles. More preferably are water dispersible or soluble corrosion inhibitors that exhibit good adhesion to substrates under flowing conditions as described in U.S. Pat. No. 6,572,789 and the references cited within it.

Typically the cutting fluids of this invention comprise a corrosion inhibitor. The amount of corrosion inhibitor in the cutting fluid, based on the total weight of the fluid, is typically greater than zero, more typically at least 0.01 and even more typically 0.1, wt %. The maximum amount of corrosion inhibitor in the cutting fluid is mostly a matter of economics and convenience, but typically it is not in excess of 2, more typically not in excess of 1, wt %.

Chelant

Any compound that is compatible with the other components of the cutting fluid and that will bind or otherwise attach to a swarf particle or other particulate present in the cutting fluid due to the treatment of a workpiece or the formulation, transport or storage of the cutting fluid can be used in the practice of this invention. Exemplary chelants include ethylenediamine N'N'-tetraacetic acid (EDTA) and its salts and derivatives; hydroxyethyliminodiacetic acid (HEIDA and its salts and derivatives; methyl-glycine-diacetic acid (MGDA) and its salts and derivatives; and glutamic-N,N-diacetic acid (GLDA) and its salts and derivatives. Due to their biodegradability, HEIDA, MGDA and GLDA are often preferred.

Typically the cutting fluids of this invention comprise a chelant. The amount of chelant in the cutting fluid, based on the total weight of the fluid, is typically greater than zero, more typically at least 0.01 and even more typically 0.1, wt %. The maximum amount of chelant in the cutting fluid is mostly a matter of economics and convenience, but typically it is not in excess of 2, more typically not in excess of 1, wt %.

Biocide

Any compound that is compatible with the other components of the cutting fluid and that will effectively minimize or eliminate cellular growth, e.g., bacterial, algae, etc., in the cutting fluid can be used in the practice of this invention. Cutting fluids are often formulated well in advance of their use, and are frequently stored for extended periods of time in the reservoir tanks of the equipment in which they are used, e.g., diamond wiresaws. The presence of cellular growth in the cutting fluids can diminish the performance of the fluid and result in clogs within the equipment, e.g., plugged spray nozzles. Exemplary biocides include triazine, oxazolidine, sodium omadine and iodocarbamate.

Typically the cutting fluids of this invention comprise a biocide. The amount of biocide in the cutting fluid, based on the total weight of the fluid, is typically greater than zero, more typically at least 0.01 and even more typically 0.1, wt %. The maximum amount of biocidein the cutting fluid is mostly a matter of economics and convenience, but typically it is not in excess of 2, more typically not in excess of 1 and even more typically not in excess of 0.8, wt %.

Additives

The cutting fluid may contain other components or ingredients as well, such as polar solvents (e.g., alcohols, amides, esters, ethers, ketones, glycol ethers or sulfoxides), thickeners (e.g., xanthan gum, rhamsan gum or an alkyl-cellulose such as hydroxymethylcellulose, carboxymethylcellulose), dyes, fragrances and the like. These other ingredients are used in known manners and in known amounts. The total amount of additives, if present, in the cutting fluid is typically 0.01 to 20, more typically 0.05 to 10 and even more typically 0.1 to 5 percent by weight (wt %).

Formulation of the Cutting Fluids

The cutting fluids of this invention are formulated using known equipment and known techniques. The various components are typically added to one another in any order at room temperature, e.g., 23° C., or with low heat, e.g., 30° C. or 40° C., using conventional mixing equipment to provide agitation so as to promote good mixing of the components to produce a homogeneous mixture or blend. With water the dominant component of a fully formulated fluid, typically the other components are added to water.

In one embodiment the cutting fluid comprises at least one of a defoamer, wetting agent, dispersing agent, corrosion inhibitor, chelant or biocide. In one embodiment the cutting fluid comprises at least two of a defoamer, wetting agent, dispersing agent, corrosion inhibitor, chelant or biocide. In one embodiment the cutting fluid comprises at least three of a defoamer, wetting agent, dispersing agent, corrosion inhibitor, chelant or biocide. In one embodiment the cutting fluid comprises at least four of a defoamer, wetting agent, dispersing agent, corrosion inhibitor, chelant or biocide. In one embodiment the cutting fluid comprises at least five of a defoamer, wetting agent, dispersing agent, corrosion inhibitor, chelant or biocide. In one embodiment the cutting fluid comprises all six of a defoamer, wetting agent, dispersing agent, corrosion inhibitor, chelant or biocide.

In one embodiment the cutting fluid is fully formulated at a manufacturing facility, packaged and shipped, with or without intermediate storage, to an end user who may or may not further store it prior to use.

In one embodiment the cutting fluid is a pre-mix or concentrated formulation comprising most, if not all, of the ingredients other than a full complement of water, e.g., water comprises less than 95, or 90, or 80, or 70, or 60, or 50 or 40 or 30 or 20 or 10 wt % of the concentrate, or is absent from the concentrate. In this embodiment the non-water components of the formulation are mixed, with or without a minor amount of water and using conventional mixing equipment and techniques, to form a pre-mix or concentrate that is then packaged and shipped, with or without intermediate storage, to an end user who may or may not further store it prior to use. The concentrate typically comprises, at a minimum, the PAG, wetting agent and defoamer, dissolved in a minor amount of water, in amounts sufficient to provide their respective desired concentrations when the cutting fluid is fully formulated. When ready for use, the pre-mix or concentrate is simply diluted with water to the desired strength.

In another embodiment the cutting fluid is simply mixed as an on-site formulation.

Use of the Cutting Fluids

The cutting fluid is used in a known matter. Typically it is sprayed upon a cutting wire as a workpiece is brought into contact with the wire. The cutting wire is part of a cutting apparatus commonly known as a wiresaw or wire-web, and it usually comprises a row of fine wires arranged parallel to each other and at a fixed pitch. A workpiece is pressed against these fine wires (which typically have a diameter of 0.1-0.2 millimeters (mm) running in parallel with one another in the same direction, while the cutting fluid is supplied between the workpiece and the wires, the workpiece sliced into wafers by an abrasive grinding action. These wiresaws are described more fully in U.S. Pat. Nos. 3,478,732, 3,525,324, 5,269,275 and 5,270,271. For diamond wiresaws, the abrasive particles are embedded onto the moving web or wire.

The cutting fluids of this invention can be used in other treatments of a hard, brittle material, such as an ingot, crystal or wafer of silicon, gallium arsenide (GaAs), gallium phosphide (GaP), or sapphire. These other treatments include without limitation grinding, etching and polishing. These fluids work particularly well in applications in which the abrasive particles are embedded on a substrate, e.g., wire, ceramic, etc.

The following examples are illustrative of certain embodiments of the present invention. All parts and percentages are based on weight except as otherwise indicated.

Specific Embodiments

Materials

The materials used in the following examples are detailed in Table 1.

PCA is sold under the trademark PCA-I by Jiangsu Bote New Materials Co., Ltd. For PAG 1, "x+y=26" is a common expression for the copolymer structure. The polymer is synthesized by building the PO block first and then adding EO. EO is randomly added to both sides of the PO block. The size on both sides is typically fairly close, e.g., each of x and y are about 13.

PAG 5 is a modified secondary alcohol ethoxylate sold under the trademark ECOSURF™ LF-45 by The Dow Chemical Company.

PAG 6 is also a modified secondary alcohol ethoxylate but sold under the trademark ECOSURF™ LF-30 by The Dow Chemical Company.

PAGs 1-4 are available commercially or can be prepared using well known procedures. For example, a suitable alcohol, a glycol or its oligomer, or polyol, e.g. butanol, mono-propylene glycol, diethylene glycol, secondary alcohol, is alkoxylated with alkylene oxide compounds. Alkoxylation processes may, for instance, be carried out in the presence of acidic or alkaline catalysts, or by using metal cyanide catalysts. Alkaline catalysts may include, for instance, hydroxides or alcoholates of sodium or potassium, including NaOH, KOH, sodium methoxide, potassium methoxide, sodium ethoxide and potassium ethoxide. Base catalysts are normally used in a concentration of from 0.02 percent to about 5 percent by weight, preferably about 0.05 percent to about 1 percent by weight based on starting material.

The addition of alkylene oxides (e.g., ethylene oxide, propylene oxide, or butylene oxide) may, for instance, be carried out in an autoclave under pressures from about 10 psig to about 200 psig, preferably from about 60 psig to about 100 psig. The temperature of alkoxylation may range from about 30° C. to about 200° C., preferably from about 100° C. to about 160° C. After completion of oxide feeds, the product is typically allowed to react until the residual oxide is less than about 10 ppm. After cooling the reactor to an appropriate temperature ranging from about 20° C. to 130° C., the residual catalyst may be left unneutralized, or neutralized with organic acids, such as acetic, propionic, or citric acid. Alternatively, the product may be neutralized with inorganic acids, such as phosphoric acid or carbon dioxide. Residual catalyst may also be removed using ion exchange or an adsorption media, such as diatomaceous earth.

TABLE 1

| Materials | | |
|---|---|---|
| Product Name | Cloud Point | Chemical Structure |
| PCA | N/A | Polyether grafted polycarboxylate. |
| PAG1 | 62° C. | 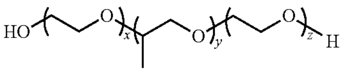 EO/PO/EO block, x + z = 26, y = 30 |
| PAG2 | 85° C. | 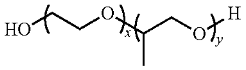 EO/PO random distribution, x = 25.9, y = 13.1 |
| PAG3 | 71° C. | 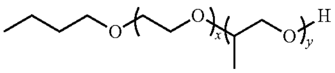 EO/PO random distribution, x = 7.7, y = 5.8 |
| PAG4 | 50° C. | 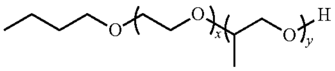 EO/PO random distribution, x = 44, y = 33 |
| PAG5 | 40-45° C. | Modified secondary alcohol ethoxylate |
| PAG6 | 29-34° C. | Modified secondary alcohol ethoxylate |

TABLE 2

| Equipment | |
|---|---|
| Instruments | Model and Manufacturer |
| Balance | XS204 and XS4002S from Mettle Toledo |
| Four ball extreme pressure tester | Jinan Xinshijin |
| Auto sampler | G 1888 |
| GC-TCD | Agilent |

Experimental Methods

Four-Ball Wear Testing

TABLE 3

| Coolant Composition | | | | | |
|---|---|---|---|---|---|
| | 1# | 2# | 3# | 4# | 5# |
| PCA | 13 | 13 | 13 | 13 | 13 |
| Water | 87 | 84.5 | 84.5 | 84.5 | 84.5 |
| PAG2 | | 2.5 | | | |
| PAG3 | | | 2.5 | | |
| PAG4 | | | | 2.5 | |
| PAG1 | | | | | 2.5 |

TABLE 4

| Test Conditions | |
|---|---|
| Coolant dilution with DI water | 1:12 ratio |
| Temperature | 60° C. |
| Speed | 1800 rpm |
| Duration Time | 10 s |
| Extreme Pressure | 140N |

FIG. 1 reports the four-ball wear testing results. The less wear diameter, the better the lubricity.

Conclusion

The formulation without polyglycol additive results in a large wear scar. Adding PAG4 or PAG1, which have cloud points near or below the testing temperature of 60° C. significantly reduces the size of the wear scars, indicating better lubricity. When PAG2 or PAG3, with cloud points higher than the working temperature is used as the PAG, less lubricity improvement is observed. The results indicate that keeping the cloud point of the PAG near or below the working temperature provides good lubricity. Considering that the local temperature at the contact point of the wiresaw with a silicon ingot can be as high as 60-80° C., a suitable PAG in the practice of this invention should have a cloud point not exceeding 80° C.

Hydrogen Gas Generation

When in contact with water under diamond wire cutting conditions, fresh silicon (either from a fresh wafer surface or silicon powder surfaces) may have a reaction with water to generate hydrogen gas. Such surface reactions may also result in wafer surface cleaning difficulty. In this invention, the phased-out oil layers on the silicon surfaces may suppress the reaction between silicon and water when the temperature is higher than the cloud point of the PAG in the aqueous cutting fluid. Quantitative measurements on hydrogen gas generation of silicon powders in different formulations as specified in Table 5 below are conducted to compare the impact of the PAG on the silicon surface reaction.

$$Si_{(s)}+2H_2O_{(l)}=SiO_{2(s)}+2H_{2(g)}.$$

TABLE 5

| | Coolant Composition | | | |
|---|---|---|---|---|
| | A | B | C | D |
| PCA | 13 | 13 | 13 | 13 |
| Water | 87 | 84.5 | 84.5 | 84.5 |
| PAG3 | | 2.5 | | |
| PAG4 | | | 2.5 | |
| PAG1 | | | | 2.5 |

TABLE 6

| Test Condition | |
|---|---|
| Coolant Dilution with DI Water | 1:20 ratio |
| Test Mixture | Diluted Coolant 4 g + Silicon Powder 0.5 g + Sea Sand 2 g |
| Temperature | 60° C. |
| Shaking Condition | G 1888 Auto Sampler for 20 hrs. |
| Hydrogen Content Test | GC-TCD |

In this experiment, fresh silicon surfaces are generated by the friction between silicon powders and sea sands under shaking condition. The amount of hydrogen generated during the process is analyzed by GC-TCD. Agilent 6890N gas chromatograph coupled to a thermal conductive detector is used. TCD detector temperature is set at 180° C. Reference flow is 20 mL/min, and makeup flow is 6 mL/min. 0.5 g Si powder, 4 g diluted water-based coolant (coolant:water=1:12), and 2 g sea sand are put into a 22 mL sealed headspace vial, and the vial is heated in an Agilent G1888 auto sampler at 60° C. for 20 hours while shaking. The hydrogen generated in the headspace vial is quantified using GC-TCD. The sea sand used here is to make sure that Si powders have good dispersion in the coolant during the shaking process.

Results

Figure 2:
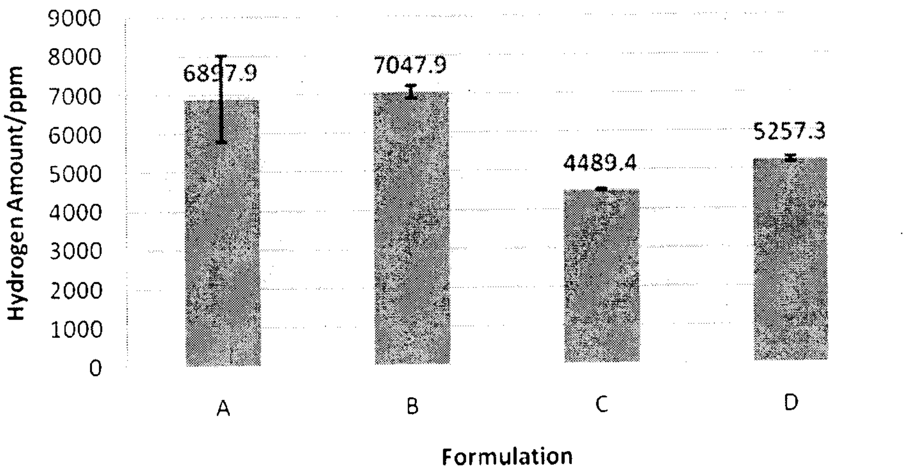
FIG. 2 is a bar graph reporting hydrogen generation by freshly generated silicon surfaces mimicking the cutting process of silicon ingots using a wire diamond saw and various coolants.

FIG. 2 reports the results of the hydrogen gas generation test.

Conclusion

Compared to water and PAG3 that has a cloud point higher than 60° C., two PAG, i.e., PAG1 and PAG4 which have cloud points near or below 60° C., showed less hydrogen generation, indicating that the surface reaction is suppressed. The results demonstrated that using a PAG with a cloud point near or below the working temperature suppresses the silicon surface reaction. Considering the local temperature at the contact point of the wiresaw with the silicon ingot can be as high as 80° C., a suitable PAG should have a cloud point not exceeding 80° C.

Formulation Stability

When a PAG with a cloud point near or below 30° C. is used in the formulation of Table 7, the stability of the formulation becomes very poor at the normal storage temperature of 23° C. For example, in a formulation in which PAG6 with cloud point near 30° C. is used as the PAG, a separated phase is observed.

TABLE 7

| Formulation 1 | |
|---|---|
| PCA | 13% |
| PAG6 | 2.5% |
| Defoamer | 1.5% |
| Biocide | 0.1% |
| Water | 82.9% |

Real Diamond Wire Wafer Slicing Test

A water-based cutting fluid with a formulation as described in Table 8 is tested on a commercial diamond wire wafer slicing machine to slice a mono-crystalline silicon ingot (300 mm*2) into 6" wafers (wafer thickness=180 microns). In the formulation, PAG5, a secondary alcohol polyglycol ether material with cloud point of 40-45° C. is used. The cutting fluid is diluted with water at 1:8 ratio in this test.

TABLE 8

| Formulation 2 | |
|---|---|
| PCA | 13% |
| PAG5 | 2.5% |
| Defoamer | 1.5% |
| Biocide | 0.1% |
| Water | 82.9% |

An overall average yield of 92.4% is achieved. No wafer surface cleaning issue is reported. This test shows that the cutting fluid formulation of this invention is able to slice silicon wafers using a diamond wire without hydrogen generation or surface cleaning issues of any significance.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A cutting fluid comprising:

Water-soluble polyalkylene glycol (PAG) with a cloud point from 30° C. to 80° C., a polyether grafted polycarboxylate dispersing agent;

Water, and at least one of:

a wetting agent;

a defoamer;

a corrosion inhibitor;

a chelant; and a biocide, wherein the PAG is present in an amount of 0.01 to 20 weight percent based on the weight of the cutting fluid; and wherein the water is present in an amount of 90 to 98 weight percent based on the weight of the cutting fluid.

2. A process of cutting a hard, brittle material with a wiresaw used in conjunction with a water-based cutting fluid, the process comprising the step of contacting the material with the wiresaw and cutting fluid under cutting conditions at a working temperature for the cutting fluid, the cutting fluid comprising:

Water-soluble PAG with a cloud point from 30° C. to 80° C., where the cloud point of the water-soluble PAG is below the working temperature for the cutting fluid, a polyether grafted polycarboxylate dispersing agent;

Water, and at least one of:

a wetting agent;

a defoamer;

a corrosion inhibitor;

a chelant; and a biocide, wherein the PAG is present in an amount of 0.01 to 20 weight percent based on the weight of the cutting fluid; and wherein the water is present in an amount of 90 to 98 weight percent based on the weight of the cutting fluid.

3. The cutting fluid of claim 1 comprising at least two of a wetting agent, a defoamer, a corrosion inhibitor, a chelant and a biocide.

4. The cutting fluid of claim 1 comprising at least three of a wetting agent, a defoamer, a corrosion inhibitor, a chelant and a biocide.

5. The cutting fluid of claim 1 comprising at least four of a wetting agent, a defoamer, a corrosion inhibitor, a chelant and a biocide.

6. The cutting fluid of claim 1 comprising at least five of a wetting agent, a defoamer, a corrosion inhibitor, a chelant and a biocide.

7. The cutting fluid of claim 1 in which the wetting agent is present in an amount of 0.01 to 5 weight percent; the polyether grafted polycarboxylate dispersing agent is present in an amount of 0.01 to 20 weight percent; the defoamer is present in an amount of 0.01 to 5 weight percent; the corrosion inhibitor is present in an amount of 0.01 to 2 weight percent; the chelant is present in an amount of 0.01 to 2 weight percent; and biocide is present in an amount of 0.01 to 2 weight percent wherein said weight percent values are based on the weight of the cutting fluid.

8. The cutting fluid of claim 7 further comprising one or more of a polar solvent, a thickener, a dye, or a fragrance.

9. The process of claim 2 in which the hard, brittle material is a silicon ingot or wafer.

10. The process of claim 2 wherein the cutting fluid comprises at least two of a wetting agent, a defoamer, a corrosion inhibitor, a chelant and a biocide.

11. The process of claim 2 wherein the cutting fluid comprises at least three of a wetting agent, a defoamer, a corrosion inhibitor, a chelant and a biocide.

12. The process of claim 2 wherein the cutting fluid comprises at least four of a wetting agent, a defoamer, a corrosion inhibitor, a chelant and a biocide.

13. The process of claim 2 wherein the cutting fluid comprises at least five of a wetting agent, a defoamer, a corrosion inhibitor, a chelant and a biocide.

14. The process of claim 2 wherein for the cutting fluid the wetting agent is present in an amount of 0.01 to 5 weight percent; the polyether grafted polycarboxylate dispersing agent is present in an amount of 0.01 to 20 weight percent; the defoamer is present in an amount of 0.01 to 5 weight percent; the corrosion inhibitor is present in an amount of 0.01 to 2 weight percent; the chelant is present in an amount of 0.01 to 2 weight percent; and biocide is present in an amount of 0.01 to 2 weight percent wherein said weight percent values are based on the weight of the cutting fluid.

15. The process of claim 14 wherein the cutting fluid further comprises one or more of a polar solvent, a thickener, a dye, or a fragrance.

* * * * *